(12) United States Patent
Chiu et al.

(10) Patent No.: US 11,499,244 B2
(45) Date of Patent: Nov. 15, 2022

(54) DEVICE FOR IMPREGNATION USING ELECTROPHORESIS

(71) Applicants: MARKETECH INTERNATIONAL CORP., Taipei (TW); BIO-HELIX CO., LTD., Taichung (TW)

(72) Inventors: De-Li Chiu, Taipei (TW); Yi-Lin Tsai, New Taipei (TW); Fan-Pin Yen, New Taipei (TW)

( * ) Notice: Subject to any disclaimer, the term of this patent is extended or adjusted under 35 U.S.C. 154(b) by 505 days.

(21) Appl. No.: 16/803,346

(22) Filed: Feb. 27, 2020

(65) Prior Publication Data

US 2021/0269933 A1 Sep. 2, 2021

(51) Int. Cl.
| | | |
|---|---|---|
| C25D 13/00 | (2006.01) | |
| G01N 27/447 | (2006.01) | |
| B01F 33/85 | (2022.01) | |
| B01F 35/71 | (2022.01) | |

(52) U.S. Cl.
CPC .............. *C25D 13/00* (2013.01); *B01F 33/85* (2022.01); *B01F 35/7176* (2022.01); *G01N 27/44704* (2013.01); *G01N 27/44743* (2013.01); *G01N 27/44747* (2013.01)

(58) Field of Classification Search
CPC ............. C25D 13/00; G01N 27/44704; G01N 27/44743; G01N 27/44747; B01F 33/84; B01F 33/846; B01F 33/85; B01F 35/7176; B01F 35/71805
USPC ............... 366/181.5; 204/466, 470, 619–620
See application file for complete search history.

(56) References Cited

U.S. PATENT DOCUMENTS

| | | | | |
|---|---|---|---|---|
| 4,986,891 A | * | 1/1991 | Sarrine | G01N 27/44721 204/613 |
| 5,443,791 A | * | 8/1995 | Cathcart | B01L 3/50825 422/65 |
| 5,460,709 A | * | 10/1995 | Sarrine | G01N 27/44782 204/612 |
| 6,267,579 B1 | * | 7/2001 | Li | B29C 31/044 204/620 |
| 6,932,895 B2 | * | 8/2005 | Anderson | G01N 27/44704 204/612 |
| 6,942,775 B1 | * | 9/2005 | Fox | G01N 27/44704 204/620 |

(Continued)

FOREIGN PATENT DOCUMENTS

DE 10158645 A1 * 6/2003 .......... B01F 11/0094

*Primary Examiner* — Charles Cooley
(74) *Attorney, Agent, or Firm* — Egbert, McDaniel & Swartz, PLLC

(57) ABSTRACT

Disclosed is a device for impregnation using electrophoresis, which includes a chassis, a storing unit, a pipeline unit, an injection unit, a bearing tank, a first driver element and a second driver element, wherein the storing unit has several storage tanks storing the materials for impregnation. The pipeline unit has several pipelines connecting the storage tanks and the injection unit. The injection unit has a static mixing tube and an injector, so as to inject said materials for impregnation into the several slide sets located in the bearing tank. The first driver element drives the bearing tank to reciprocate transversely, and the second driver element drives the injection unit to shift up and down. The device can perform impregnation operations automatically, with quick operation and low operational difficulty level, while the prepared gel has high quality stability and yield.

12 Claims, 12 Drawing Sheets

(56) References Cited

U.S. PATENT DOCUMENTS

| | | | |
|---|---|---|---|
| 7,261,800 B1* | 8/2007 | Nakazato | G01N 27/447 422/65 |
| 2001/0018064 A1* | 8/2001 | Li | B29C 31/044 204/620 |
| 2021/0269933 A1* | 9/2021 | Chiu | G01N 27/44704 |

* cited by examiner

DEVICE FOR IMPREGNATION USING ELECTROPHORESIS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to the field of gel electrophoresis, and more particularly to the innovative structure type of a device for impregnation using electrophoresis.

2. Description of Related Art Including Information Disclosed Under 37 CFR 1.97 And 37 CFR 1.98

In biotechnology, it is required for the pre-operation of the electrophoretic engineering for separation or analysis of DNA, RNA and PROTEIN that both sides and the bottom of two superposed slides shall be sealed up, and liquid gel stock solution is injected through the upper opening into the gap between two slides, so as to form a slide set containing gel to complete the pre-operation of electrophoretic engineering.

The gel is polymerized of acrylamide and crosslinking agent. For preparation of gel, the acrylamide, crosslinking agent and deionized water are mixed into a first gel stock solution and a second gel stock solution. The main difference between the first gel stock solution and the second gel stock solution is different pH values of the selected trihydroxymethyl aminomethane (generally abbreviated to Tris), the first gel stock solution is injected into the slide set composed of two slides, and then the first gel stock solution is flattened, when the first gel stock solution is polymerized into separating gel, the flattening liquid is poured out, and the second gel stock solution is injected into the slide set, so that the second gel stock solution is polymerized into stacking gel on the upper layer of the separating gel, the impregnation operation for electrophoretic engineering is completed.

However, said impregnation operation still has the following problems in practical experience. The known impregnation is operated manually. The impregnation operation shall be performed in time after the first gel stock solution and the second gel stock solution are prepared, to avoid the polymerization of the first gel stock solution or the second gel stock solution failing the injection into the slide set. When the first gel stock solution is injected into the slide set, the flattening operation shall be performed as soon as possible to avoid the polymerization of the first gel stock solution influencing the effect of flattening, leading to uneven joint of the separating gel and the stacking gel. Generally speaking, the known manual impregnation operation has high difficulty level, the quality of the prepared gel depends on the operator's technique and experience, the quality stability and yield of the gel are unlikely to be enhanced.

Therefore, for the aforesaid problems in the known manual impregnation operation, how to develop an innovative structure with more ideal practicability is what the users desire, as well as the objective and direction of research and development the related suppliers shall break through. In view of this, this inventor has years' experience in manufacturing, developing and designing related products, the present invention with practicability is obtained after detailed design and careful evaluation for the aforesaid objective.

BRIEF SUMMARY OF THE INVENTION

The primary object of the present invention is to provide a device for impregnation using electrophoresis. The technical problem to be solved is to break through how to develop a novel device for impregnation using electrophoresis with more ideal practicability which can perform impregnation operation automatically.

Based on said purpose, the present invention provides a device for impregnation using electrophoresis, which comprises a chassis;

a storing unit located on the chassis, the storing unit comprises a first storage tank, a second storage tank, a third storage tank, a fourth storage tank and a fifth storage tank, wherein the first storage tank stores the liquid acrylamide, the second storage tank stores liquid first agent, the third storage tank stores liquid second agent, the fourth storage tank stores the flattening liquid, the fifth storage tank stores deionized water;

a pipeline unit, the pipeline unit comprises a first pipeline, a second pipeline, a third pipeline, a fourth pipeline, a fifth pipeline, a three-way valve and a sixth pipeline, wherein the first pipeline, the second pipeline, the third pipeline, the fourth pipeline and the fifth pipeline are connected to the first storage tank, the second storage tank, the third storage tank, the fourth storage tank and the fifth storage tank respectively, and the first pipeline, the second pipeline, the third pipeline, the fourth pipeline and the fifth pipeline are provided with a pump respectively; the second pipeline, the third pipeline and the sixth pipeline are connected to the three-way valve respectively; the three-way valve selectively controls the second pipeline or the third pipeline to connect the sixth pipeline;

an injection unit located on the chassis; the injection unit comprises a main bracket, a static mixing tube and an injector; the static mixing tube and the injector are configured on the main bracket upright; the fifth pipeline and the sixth pipeline are connected to the static mixing tube respectively, so that the static mixing tube injects the first gel stock solution composed of the acrylamide, the first agent and the deionized water or the second gel stock solution composed of the acrylamide, the second agent and the deionized water into a slide set; the fourth pipeline is connected to the injector, so that the injector injects or removes the flattened liquid from the slide set;

a bearing tank, the bearing tank is located under the static mixing tube and the injector, several upright embedding grooves are formed on both sides of the bearing tank, so that both sides of the slide set slide in the embedding grooves to locate the slide set in the bearing tank;

a first driver element located on the chassis, the first driver element is in contact with the bearing tank, so as to drive the transversely reciprocating displacement of the bearing tank;

a second driver element located on the chassis, the second driver element is in contact with the injection unit, so as to drive the injection unit to shift up and down; and a control unit, the control unit is connected to the pipeline unit, the first driver element and the second driver element for controlling the actuation of the pumps, the three-way valve, the first driver element and the second driver element.

With the innovative structure type and technical characteristics, in comparison to prior art, the present invention can perform impregnation operation automatically, it is characterized by fast operation, low operational difficulty level, high quality stability and yield of the prepared gel.

DETAILED DESCRIPTION OF THE INVENTION

Figure 1:
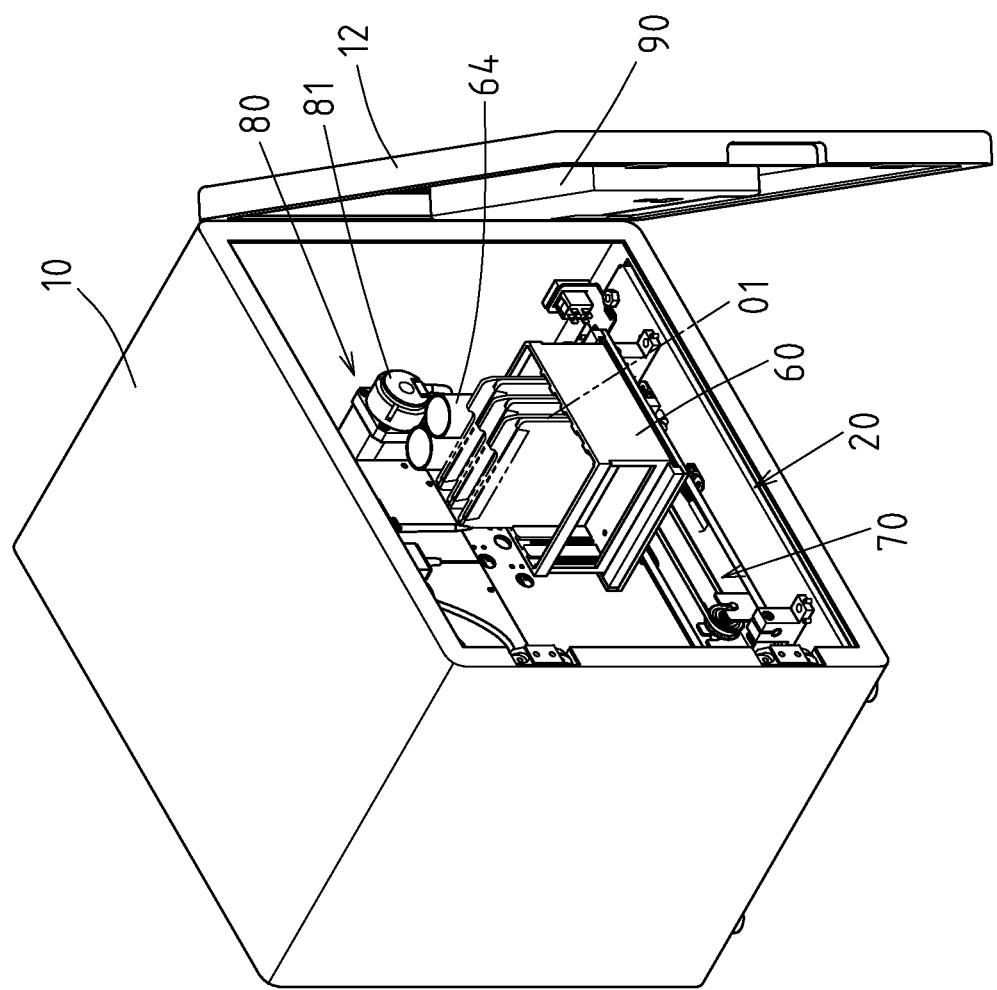
FIG. 1 is the stereogram of appearance of the preferred embodiment of the present invention.

FIG. 1 to FIG. 8 show the preferred embodiments of the device for impregnation using electrophoresis of the present invention, but the embodiments are for illustration only, the patent application is not limited to this structure.

A preferred embodiment of said device for impregnation using electrophoresis comprises a cabinet 10, a chassis 20, a storing unit 30, a pipeline unit 40, an injection unit 50, a bearing tank 60, a first driver element 70, a second driver element 80 and a control unit 90. Wherein the chassis 20, the storing unit 30, the pipeline unit 40, the injection unit 50, the bearing tank 60, the first driver element 70, the second driver element 80 and the control unit 90 are located in the cabinet 10, and a movable door 12 is pivoted on the front side of the cabinet 10. The control unit 90 can be configured on the movable door 12. For easy understanding of the composition of the present invention, the cabinet 10 is not shown in FIG. 2 and FIG. 3.

The storing unit 30 is located on the chassis 20, the storing unit 30 comprises a first storage tank 31, a second storage tank 32, a third storage tank 33, a fourth storage tank 34 and a fifth storage tank 35, wherein the first storage tank 31 stores liquid acrylamide, the second storage tank 32 stores liquid first agent, the third storage tank 33 stores liquid second agent, the fourth storage tank 34 stores the flattening liquid, the fifth storage tank 35 stores the deionized water. The first agent and the second agent are crosslinking agent, and the pH values of the tris for the first agent and the second agent are different.

The pipeline unit 40 comprises a first pipeline 41, a second pipeline 42, a third pipeline 43, a fourth pipeline 44, a fifth pipeline 45, a three-way valve 46 and a sixth pipeline 47, wherein the first pipeline 41, the second pipeline 42, the third pipeline 43, the fourth pipeline 44 and the fifth pipeline 45 are connected to the first storage tank 31, the second storage tank 32, the third storage tank 33, the fourth storage tank 34 and the fifth storage tank 35 respectively, and the first pipeline 41, the second pipeline 42, the third pipeline 43, the fourth pipeline 44 and the fifth pipeline 45 are provided with a pump 48 respectively, the pumps 48 pump the materials stored in the first storage tank 31, the second storage tank 32, the third storage tank 33, the fourth storage tank 34 and the fifth storage tank 35 to the first pipeline 41, the second pipeline 42, the third pipeline 43, the fourth pipeline 44 and the fifth pipeline 45 respectively.

The second pipeline 42, the third pipeline 43 and the sixth pipeline 47 are connected to the three-way valve 46 respectively, the three-way valve 46 selectively controls the second pipeline 42 or the third pipeline 43 to connect the sixth pipeline 47.

The injection unit 50 is located on the chassis 20. The injection unit 50 comprises a main bracket 51, a static mixing tube 52 and an injector 53. The static mixing tube 52 and the injector 53 are configured on the main bracket 51 upright, and the first pipeline 41, the fifth pipeline 45 and the sixth pipeline 47 are connected to the static mixing tube 52 respectively. The three-way valve 46 can be actuated to selectively control the mixing of the acrylamide, the first agent and the deionized water in the static mixing tube 52 to form the first gel stock solution, and selectively control the mixing of the acrylamide, the second agent and the deionized water in the static mixing tube 52 to form the second gel stock solution, and the static mixing tube 52 injects the first gel stock solution or the second gel stock solution into a slide set 01. The fourth pipeline 44 is connected to the injector 53, so that the injector 53 injects or extracts the flattening liquid from the slide set 01.

The bearing tank 60 is located under the static mixing tube 52 and the injector 53, several upright embedding grooves 61 are formed on both sides of the bearing tank 60, so that both sides of the slide set 01 slide in the embedding grooves 61 to locate the slide set 01 in the bearing tank 60.

The first driver element 70 is located on the chassis 20, the first driver element 70 is in contact with the bearing tank 60, so as to drive the bearing tank 60 to reciprocate transversely.

The second driver element 80 is located on the chassis 20, the second driver element 80 is in contact with the injection unit 50, so as to drive the injection unit 50 to shift up and down.

The control unit 90 is connected to the pipeline unit 40, the first driver element 70 and the second driver element 80 for actuating the pumps 48, the three-way valve 46, the first driver element 70 and the second driver element 80. Related technicians are familiar with the control unit 90, its specific composition will not be described.

Figure 9:
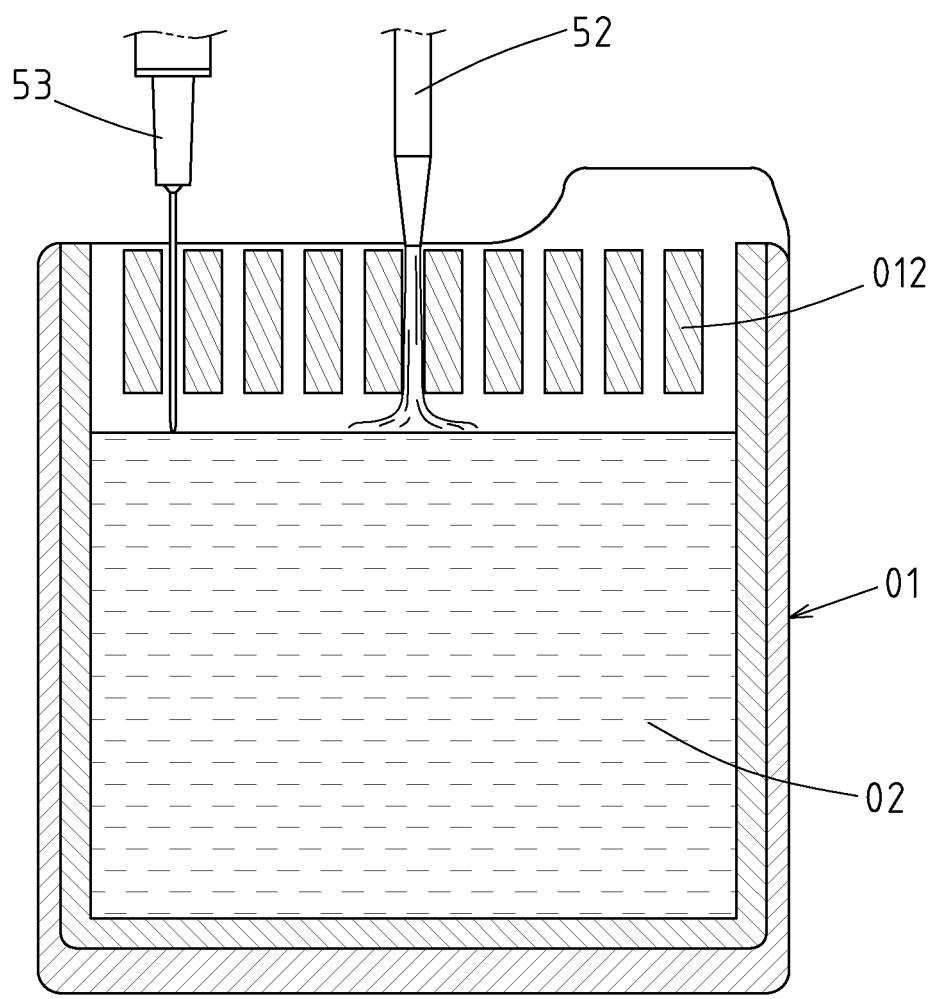
FIG. 9 is the schematic of the injection of the first gel stock solution in the preferred embodiment of the present invention.
Figure 10:
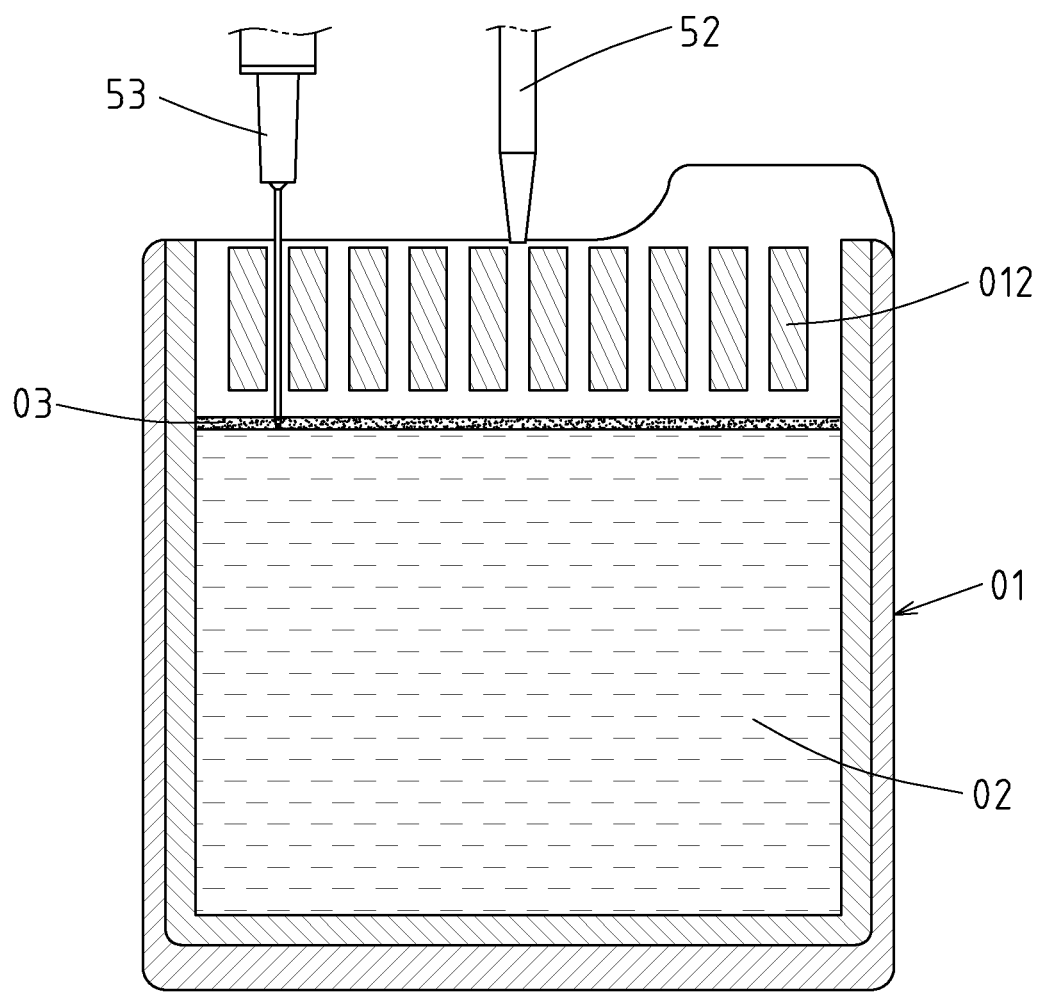
FIG. 10 is the schematic diagram of the injection of flattening liquid in the preferred embodiment of the present invention.
Figure 11:
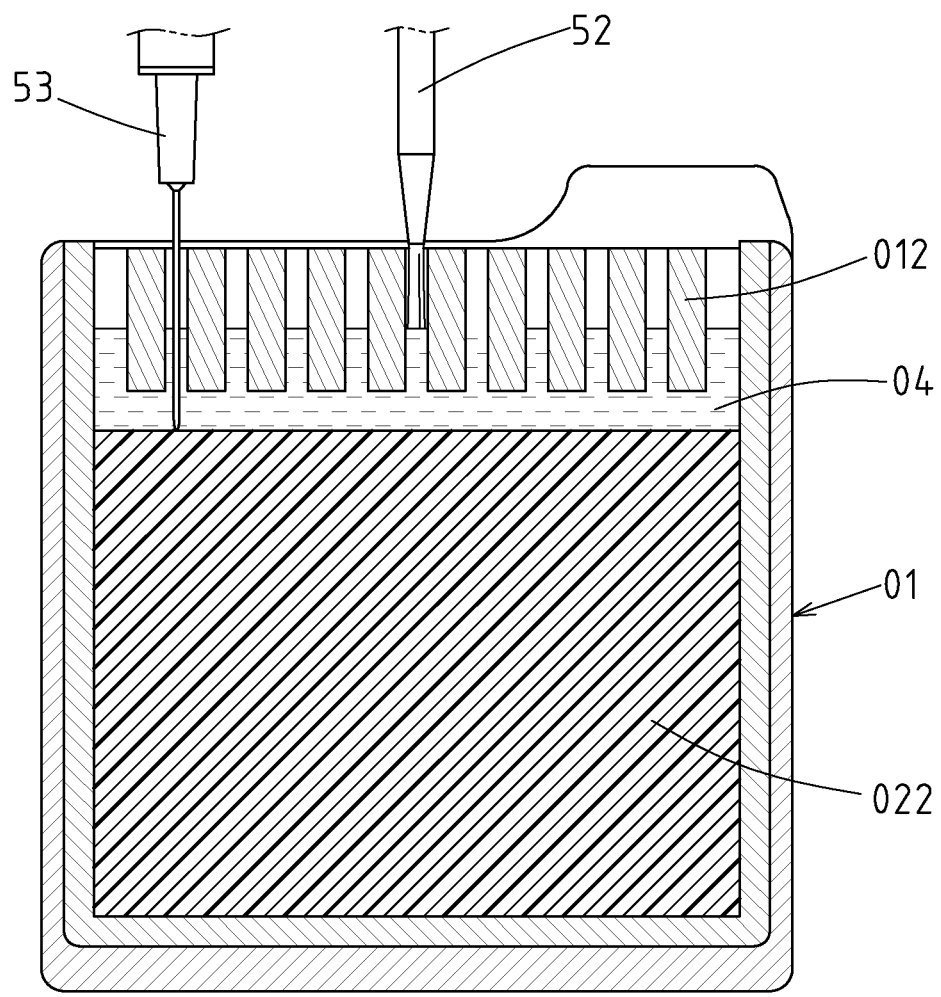
FIG. 11 is the schematic diagram of the injection of the second gel stock solution in the preferred embodiment of the present invention.
Figure 12:
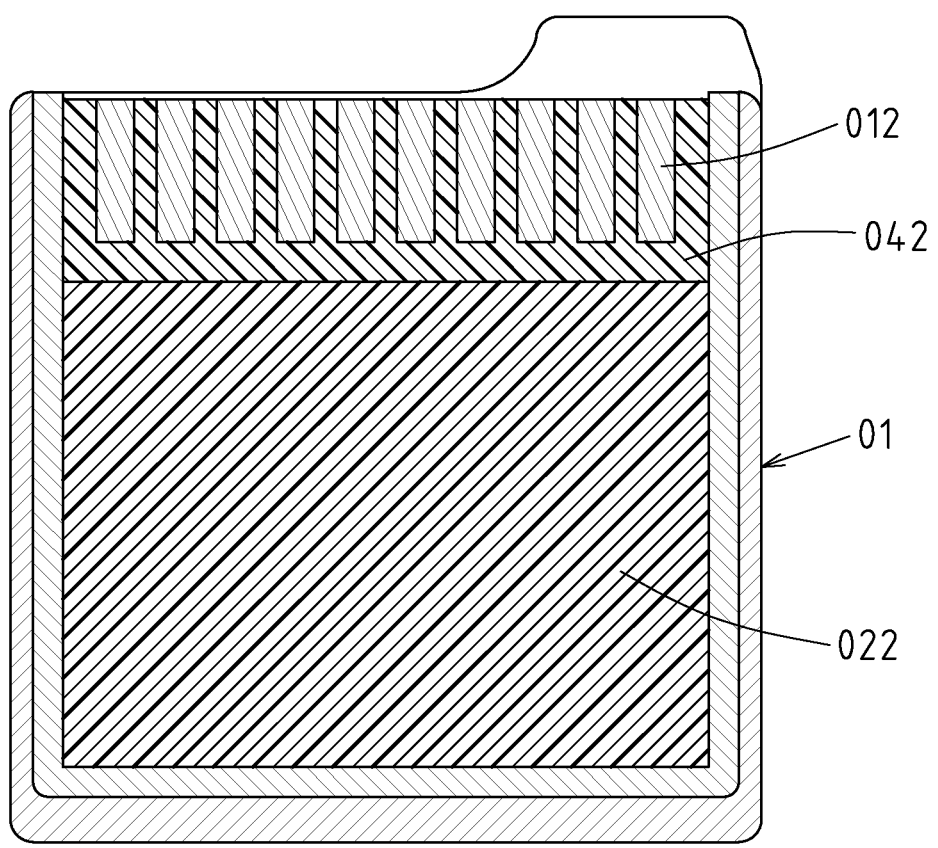
FIG. 12 is the sectional view of the slide set after impregnation operation in the preferred embodiment of the present invention.

Based on the aforesaid structural composition and technical characteristics, as well as FIG. 1 to FIG. 12, the actuation of the present invention is described below. As shown in FIG. 9, the second driver element 80 drives the main bracket 51 to descend, the static mixing tube 52 injects the first gel stock solution 02 into the slide set 01 provided with a toothed comb 012. When the liquid surface of the first gel stock solution 02 in the slide set 01 reaches the predetermined height, as shown in FIG. 10, the static mixing tube 52 stops injecting the first gel stock solution 02 into the slide set 01, the injector 53 injects the flattening liquid 03 into the slide set 01. The flattening liquid 03 is an organic solvent with specific gravity smaller than the first gel stock solution 02 and incompatible with the first gel stock solution 02, for flattening the liquid surface of the first gel stock solution 02. The flattening liquid 03 can be alcohol or isopropylketone as required. After about 20 minutes, the first gel stock solution 02 in the slide set 01 is polymerized into separating gel 022, the injection unit 50 extracts and removes the flattening liquid 03. The injection and extraction operations of the flattening liquid 03 are implemented by controlling the running direction of the pump 48 configured on the fourth pipeline 44. Afterwards, as shown in FIG. 11, the static mixing tube 52 injects the second gel stock solution 04 into the slide set 01. When the liquid surface of the second gel stock solution 04 in the slide set 01 reaches the predetermined height, the static mixing tube 52 stops injecting the second gel stock solution 04 into the slide set 01, and the injection unit 50 ascends to leave the slide set 01, as shown in FIG. 12, after about 20 minutes, the second gel stock solution 04 is polymerized into stacking gel 042, the impregnation operation is completed.

The present invention can perform the injection of the first gel stock solution 02 and the flattening liquid 03, the suction of the flattening liquid 03 and the injection of the second gel stock solution 04 automatically, quick operation and low operational difficulty level. When the bearing tank 60 is provided with multiple slide sets 01, the vertical actuation of the injection unit 50 coordinates with the transverse actuation of the bearing tank 60 to perform the injection process of the first gel stock solution 02 and the injection process of the flattening liquid 03 for the slide sets 01 one by one, and then to perform the suction process of the flattening liquid 03 and the injection process of the second gel stock solution 04 for the slide sets 01 one by one. In addition, when the first gel stock solution 02 is injected into the slide set 01, the flattening liquid 03 shall be injected as soon as possible to avoid the polymerization of the first gel stock solution 02 influencing the effect of flattening and inducing uneven junction of the separating gel 022 and the stacking gel 042. In the present invention, when the injection unit 50 descends and injects the first gel stock solution 02, the injection unit 50 and the bearing tank 60 are not displaced, the injection of the flattening liquid 03 can be performed immediately, the prepared gel has high quality stability and yield.

As shown in FIGS. 2, 4, 5, and 6, in this case, the static mixing tube 52 comprises an outer tube 521, a screw rod 522, a feed head 523 and a joint holder 524, wherein a nozzle 525 is formed in the bottom of the outer tube 521. The screw rod 522 is axially located in the outer tube 521. The top end of the screw rod 522 is coupled with the feed head 523. The feed head 523 has three inlets 526, the inlets 526 are connected to the first pipeline 41, the fifth pipeline 45 and the sixth pipeline 47 respectively. The screw rod 522 comprises several spiral segments 527 which are coupled up. A flow channel 528 is formed between the spiral segments 527 and the outer tube 521. The acrylamide, the first agent and the deionized water are mixed in the flow channel 528 to form the first gel stock solution 02, which flows down through the nozzle 525. The acrylamide, the second agent and the deionized water can be mixed in the flow channel 528 to form the second gel stock solution 04, which flows down through the nozzle 525.

Figure 2:
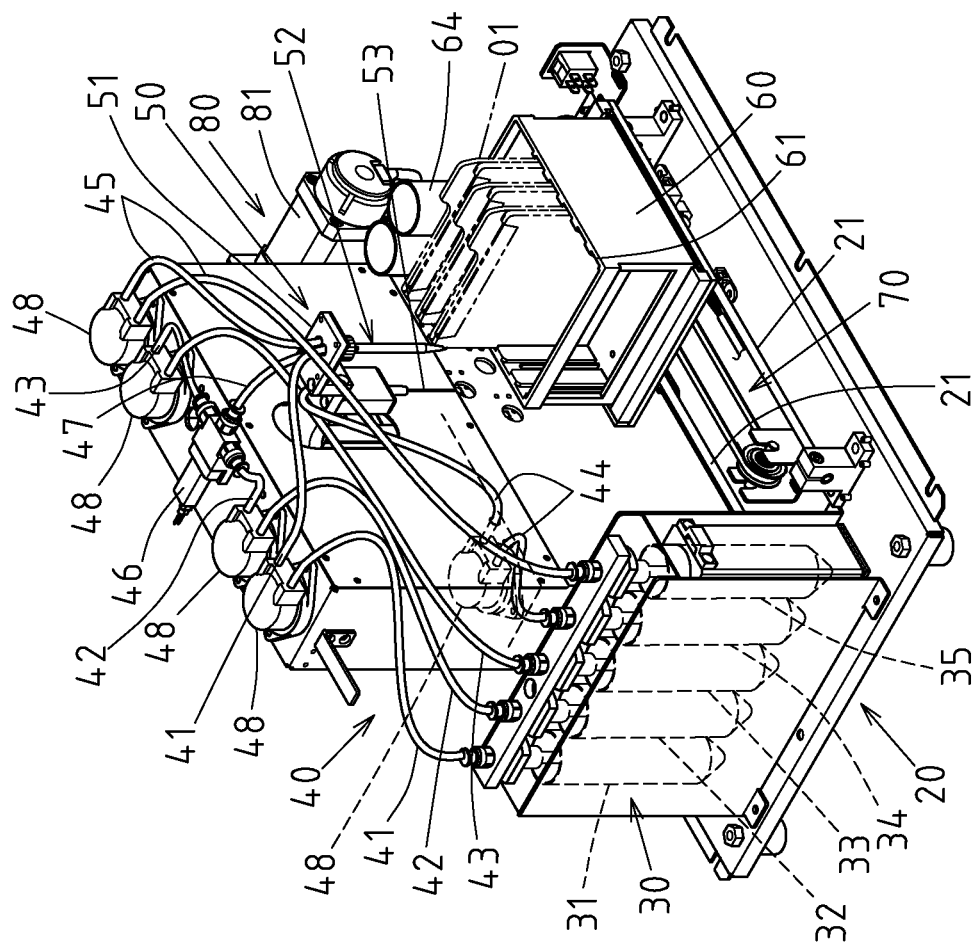
FIG. 2 is the three-dimensional diagram of internal configuration of the preferred embodiment of the present invention.
Figure 3:
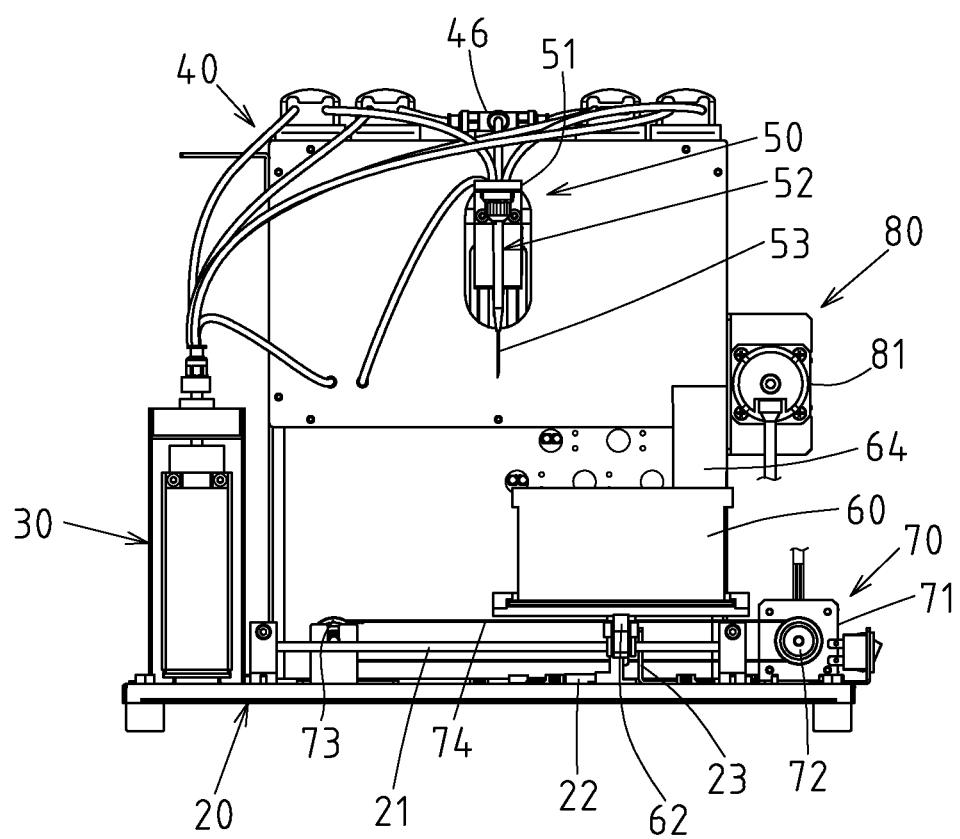
FIG. 3 is the front view of internal configuration of the preferred embodiment of the present invention.
Figure 4:
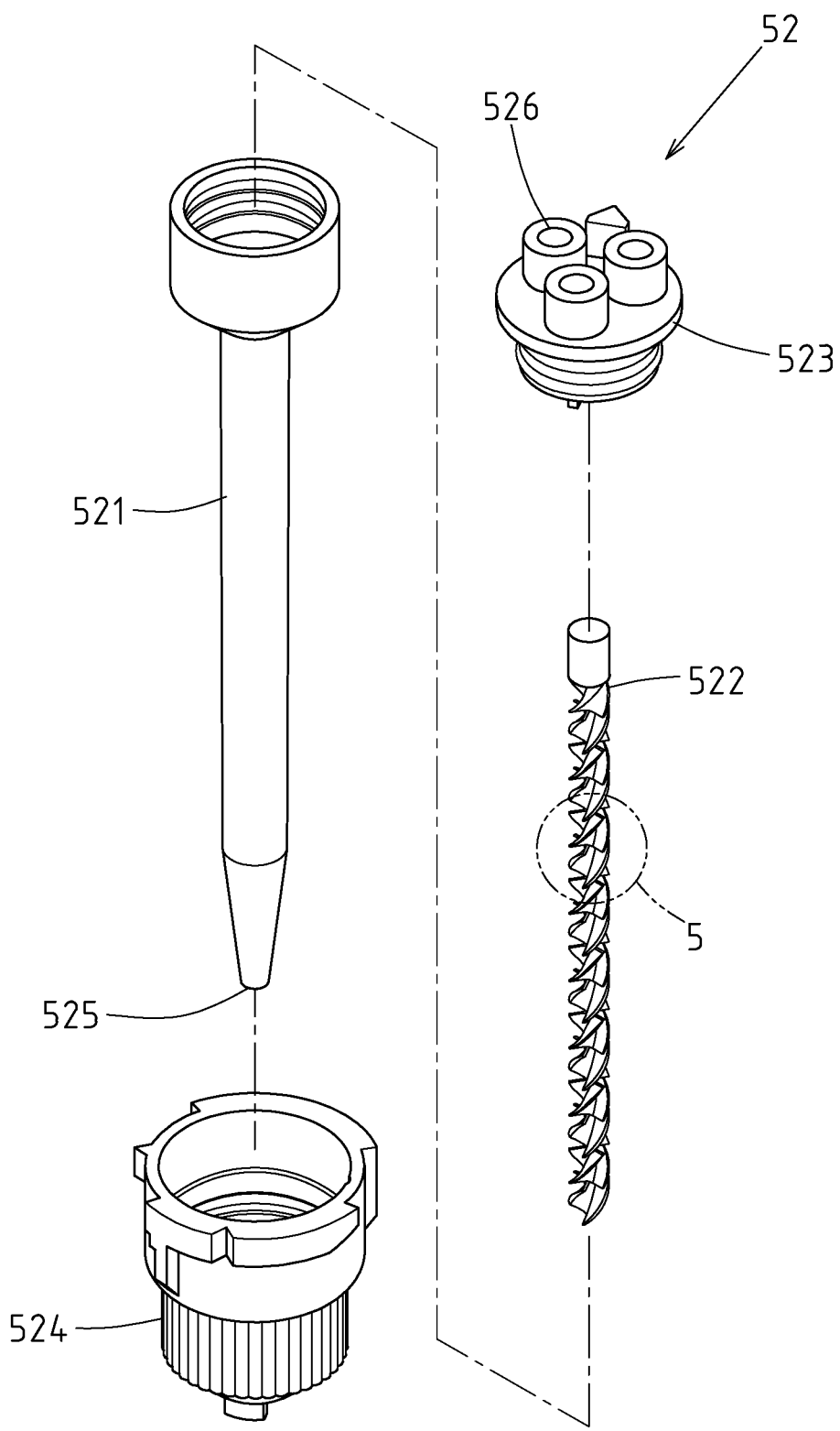
FIG. 4 is the three-dimensional exploded diagram of static mixing tube of the preferred embodiment of the present invention.
Figure 5:
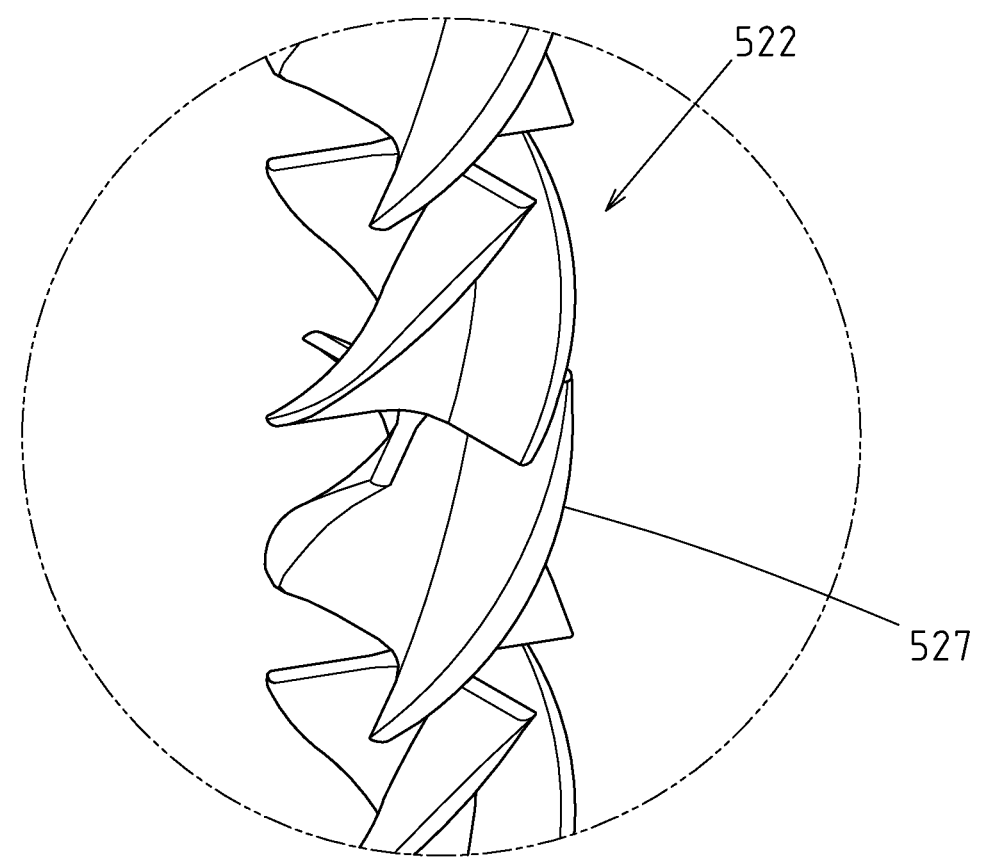
FIG. 5 is the drawing of partial enlargement of the screw rod shown in FIG. 4.
Figure 6:
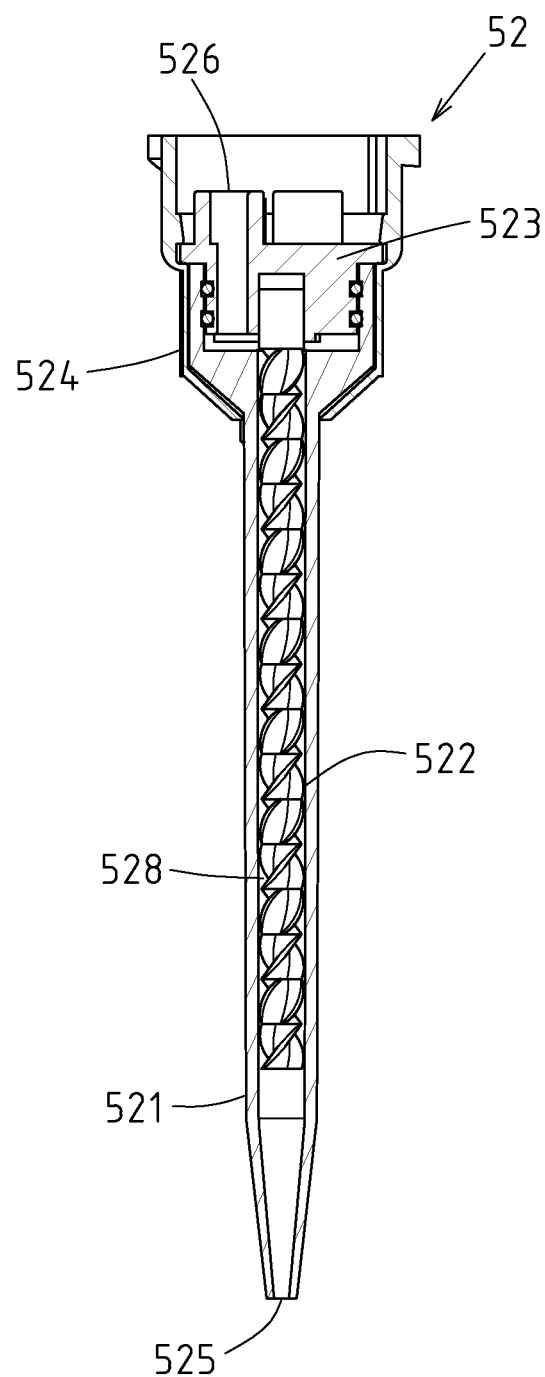
FIG. 6 is the sectional view in axial direction of static mixing tube of the preferred embodiment of the present invention.
Figure 7:
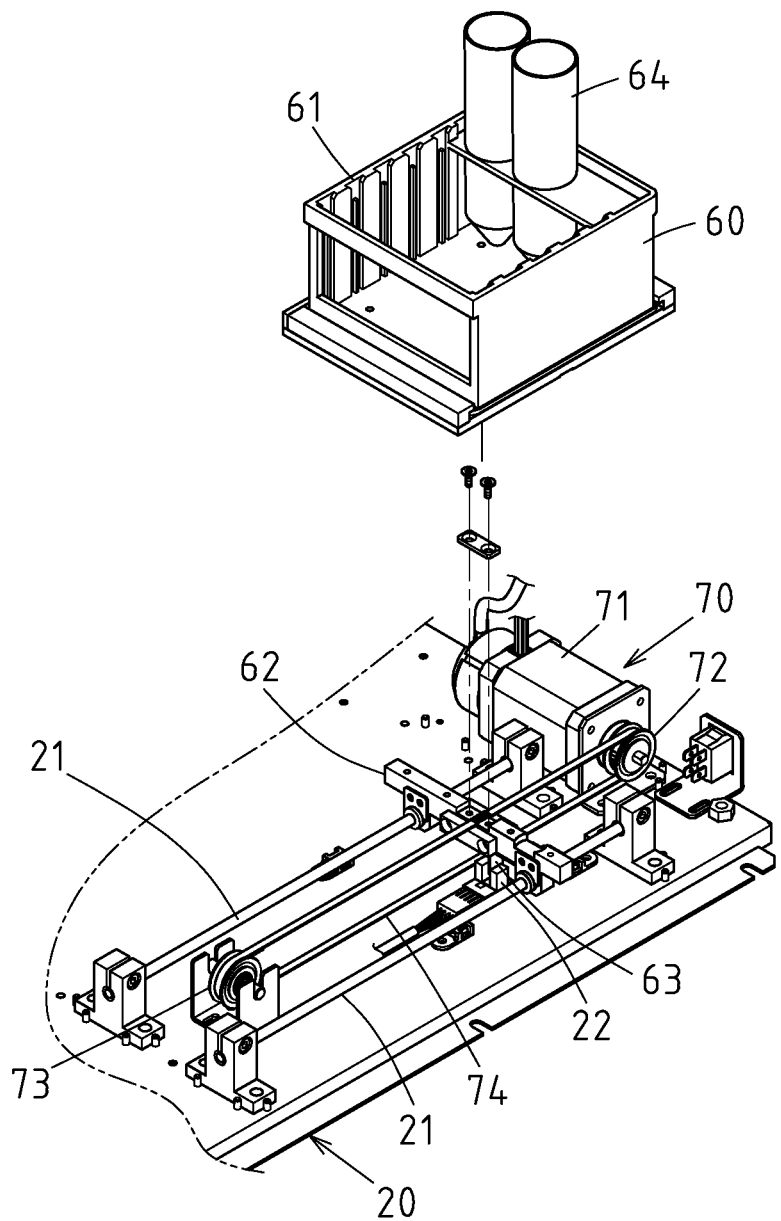
FIG. 7 is the three-dimensional exploded view of the first driver element and bearing tank of the preferred embodiment of the present invention.

As shown in FIGS. 2, 3 and 7, the first driver element 70 comprises a first motor 71, a first driving pulley 72, a first follow-up pulley 73 and a first timing belt 74, the control unit 90 controls the operation of the first motor 71. The first driving pulley 72 and the first follow-up pulley 73 are timing belt pulleys, and the first driving pulley 72 and the first follow-up pulley 73 are transversely opposite to each other. The first driving pulley 72 is coupled with the first motor 71. The first timing belt 74 winds round the first driving pulley 72 and the first follow-up pulley 73. The midsection of bottom of the bearing tank 60 is in contact with the first timing belt 74, so that the first timing belt 74 drives the bearing tank 60 to reciprocate transversely. The chassis 20 is transversely provided with two first guide rods 21. The bottom of the bearing tank 60 is provided with a pivot joint part 62, the bearing tank 60 is in contact with the timing belt 74 via the pivot joint part 62. The first guide rods 21 penetrate through the pivot joint part 62 respectively, so that the first guide rods 21 support the weight of the bearing tank 60, and the first driver element 70 can easily and smoothly drive the bearing tank 60 to reciprocate transversely.

The chassis 20 is provided with a first sensor 22, the first sensor 22 is connected to the control unit 90. The pivot joint part 62 is provided with a first trigger piece 63, so that the first sensor 22 perceives the first trigger piece 63 to locate the starting point of the displacement stroke of the bearing tank 60. In this case, the first sensor 22 is a light sensor. The first trigger piece 63 interrupts the light rays of the first sensor 22.

The chassis 20 is vertically provided with a baffle 23, the baffle 23 is laterally opposite to the pivot joint part 62, so that the baffle 23 forms a limit at one end of displacement stroke of the pivot joint part 62. When the bearing tank 60 is in the position shown in FIG. 3, the bearing tank 60 and the pivot joint part 62 can be displaced leftwards, so that the injection unit 50 performs impregnation operation for the several slide sets 01 configured on the bearing tank 60 successively. The slide sets 01 are impregnated respectively. When the first driver element 70 drives the bearing tank 60 to shift rightwards to the location shown in FIG. 3, the baffle 23 stops the pivot joint part 62, the positioning reliability at the displacement stroke end of the bearing tank 60 can be enhanced.

Figure 8:
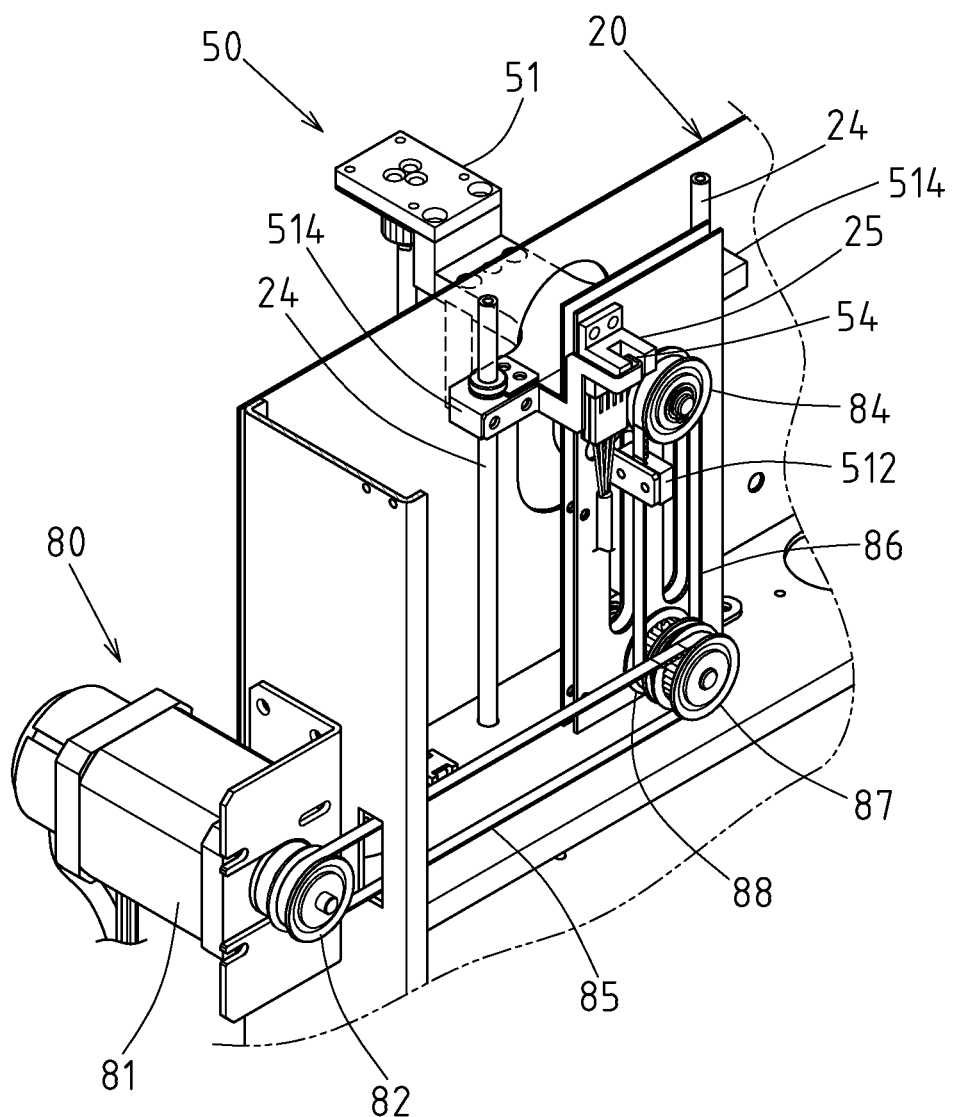
FIG. 8 is the three-dimensional diagram in the back view of the second driver element of the preferred embodiment of the present invention.

As shown in FIG. 8, the second driver element 80 comprises a second motor 81, a second driving pulley 82, a second follow-up pulley 84, a second timing belt 85, a third timing belt 86, a first dead pulley 87 and a second dead pulley 88, wherein the control unit 90 controls the operation of the second motor 81. The second driving pulley 82, the second follow-up pulley 84, the first dead pulley 87 and the second dead pulley 88 are timing belt pulleys, and the first dead pulley 87 is coaxially connected to the second dead pulley 88. The second dead pulley 88 and the second follow-up pulley 84 are vertically opposite to each other. The second driving pulley 82 is coupled with the second motor 81. The second timing belt 85 winds round the second driving pulley 82 and the first dead pulley 87. The third timing belt 86 winds round the second dead pulley 88 and the second follow-up pulley 84. The main bracket 51 has an interconnecting piece 512, the interconnecting piece 512 is in contact with the third timing belt 86. The third timing belt 86 drives the main bracket 51 to reciprocate vertically, so that the static mixing tube 52 and the injector 53 reciprocate vertically to perform impregnation operation.

The chassis 20 is provided with two second guide rods 24 in vertical direction. The main bracket 51 has two alar parts 514, the second guide rods 24 penetrate through the alar parts 514 respectively, so that the second guide rods 24 guide the main bracket 51 to reciprocate up and down. The chassis 20 is provided with a second sensor 25, the second sensor 25 is connected to the control unit 90. The main bracket 51 is provided with a second trigger piece 54, so that the second sensor 25 perceives the second trigger piece 54 to locate the starting point at the top end of displacement stroke of the main bracket 51. In this case, the second sensor 25 is a light sensor, the second trigger piece 54 interrupts the light rays of the second sensor 25.

As shown in FIGS. 1 to 3, the bearing tank 60 is provided with two reclaiming tanks 64, hereby, considering the needs for changing the materials in the first storage tank 31, the second storage tank 32, the third storage tank 33, the fourth storage tank 34 and the fifth storage tank 35 or cleaning the static mixing tube 52 and the injector 53 or the injection switching of the first gel stock solution 02 and the second gel stock solution 04, the first driver element 70 can drive the bearing tank 60 to shift, so that the reclaiming tanks 64 are opposite to the static mixing tube 52 and the injector 53 respectively, the operation of the pumps 48 is controlled, the first gel stock solution 02, the flattening liquid 03 and the second gel stock solution 04 can be injected into the reclaiming tanks 64, so as to reclaim the residual materials in the static mixing tube 52 and the injector 53.

We claim:

1. A device for impregnation using electrophoresis comprises:
   a chassis;
   a storing unit located on the chassis, the storing unit comprises a first storage tank, a second storage tank, a third storage tank, a fourth storage tank and a fifth storage tank, wherein the first storage tank stores the liquid acrylamide, the second storage tank stores liquid first agent, the third storage tank stores liquid second agent, the fourth storage tank stores the flattening liquid, the fifth storage tank stores deionized water;
   a pipeline unit, the pipeline unit comprises a first pipeline, a second pipeline, a third pipeline, a fourth pipeline, a fifth pipeline, a three-way valve and a sixth pipeline, wherein the first pipeline, the second pipeline, the third pipeline, the fourth pipeline and the fifth pipeline are connected to the first storage tank, the second storage tank, the third storage tank, the fourth storage tank and the fifth storage tank respectively, and the first pipeline, the second pipeline, the third pipeline, the fourth pipeline and the fifth pipeline are provided with a pump respectively; the second pipeline, the third pipeline, and the sixth pipeline are connected to the three-way valve respectively; the three-way valve selectively controls the second pipeline or the third pipeline to connect the sixth pipeline;
   an injection unit located on the chassis; the injection unit comprises a main bracket, a static mixing tube and an injector; the static mixing tube and the injector are configured on the main bracket upright, and the first pipeline, the fifth pipeline and the sixth pipeline are connected to the static mixing tube respectively, so that the static mixing tube injects the first gel stock solution composed of the acrylamide, the first agent and the deionized water or the second gel stock solution composed of the acrylamide, the second agent and the deionized water into a slide set; the fourth pipeline is connected to the injector, so that the injector injects or sucks the flattening liquid from the slide set;
   a bearing tank, the bearing tank is located under the static mixing tube and the injector, several embedding grooves are formed upright on both sides of the bearing tank, so that both sides of the slide set slide in the embedding grooves to locate the slide set in the bearing tank;
   a first driver element located on the chassis, the first driver element is in contact with the bearing tank, so as to drive the bearing tank to reciprocate transversely;
   a second driver element located on the chassis, the second driver element is in contact with the injection unit, so as to drive the injection unit to shift up and down; and
   a control unit, the control unit is connected to the pipeline unit, the first driver element and the second driver element for controlling the actuation of the pumps, the three-way valve, the first driver element and the second driver element.

2. The device for impregnation using electrophoresis defined in claim 1, wherein the first driver element comprises a first motor, a first driving pulley, a first follow-up pulley and a first timing belt; the control unit controls the first motor; the first driving pulley and the first follow-up pulley are timing belt pulleys, and the first driving pulley and the first follow-up pulley are transversely opposite to each other; the first driving pulley is coupled with the first motor; the first timing belt winds round the first driving pulley and the first follow-up pulley; the midsection of bottom of the bearing tank is in contact with the first timing belt, so that the first timing belt drives the bearing tank to reciprocate transversely.

3. The device for impregnation using electrophoresis defined in claim 2, wherein the chassis is provided with two first guide rods in transverse direction; the bottom of the bearing tank is provided with a pivot joint part, the bearing tank is in contact with the first timing belt via the pivot joint part; the first guide rods penetrate through the pivot joint part respectively, so that the first guide rods support the bearing tank.

4. The device for impregnation using electrophoresis defined in claim 3, wherein the chassis is provided with a first sensor, the first sensor is connected to the control unit, the pivot joint part is provided with a first trigger piece, so that the first sensor perceives the first trigger piece to locate the starting point of displacement stroke of the bearing tank.

5. The device for impregnation using electrophoresis defined in claim 4, wherein the chassis is provided with a baffle upright, the baffle is laterally opposite to the pivot joint part, so that the baffle forms a limit at one end of the displacement stroke of the pivot joint part.

6. The device for impregnation using electrophoresis defined in claim 3, wherein the chassis is provided with a baffle upright, the baffle is laterally opposite to the pivot joint part, so that the baffle forms a limit at one end of the displacement stroke of the pivot joint part.

7. The device for impregnation using electrophoresis defined in claim 1, wherein the second driver element comprises a second motor, a second driving pulley, a first dead pulley, a second dead pulley, a second follow-up pulley, a second timing belt and a third timing belt; the control unit controls the second motor; the second driving pulley, the first dead pulley, the second dead pulley and the second follow-up pulley are timing belt pulleys, and the first dead pulley is coaxially connected to the second dead pulley, the second dead pulley is opposite to the second follow-up pulley in vertical direction, the second driving pulley is coupled with the second motor; the second timing belt winds round the second driving pulley and the first dead pulley; the third timing belt winds round the second dead pulley and the second follow-up pulley; the main bracket has an interconnecting piece, the interconnecting piece is in contact with the third timing belt, so that the third timing belt drives the main bracket to reciprocate vertically.

8. The device for impregnation using electrophoresis defined in claim 7, wherein the chassis is provided with two second guide rods in vertical direction, the main bracket has two alar parts, the second guide rods penetrate through the alar parts respectively, so that the second guide rods guide the main bracket to reciprocate up and down.

9. The device for impregnation using electrophoresis defined in claim 8, wherein the chassis is provided with a second sensor, the second sensor is connected to the control unit, the main bracket is provided with a second trigger piece, so that the second sensor perceives the second trigger piece to locate the starting point at the top end of displacement stroke of the main bracket.

10. The device for impregnation using electrophoresis defined in claim 7, wherein the chassis is provided with a second sensor, the second sensor is connected to the control unit, the main bracket is provided with a second trigger piece, so that the second sensor perceives the second trigger piece to locate the starting point at the top end of displacement stroke of the main bracket.

11. The device for impregnation using electrophoresis defined in claim 1, wherein the bearing tank is provided with two reclaiming tanks, so as to reclaim the residual materials in the static mixing tube and the injector.

12. The device for impregnation using electrophoresis defined in claim 1 has a cabinet, wherein the chassis, the storing unit, the pipeline unit, the injection unit, the bearing tank, the first driver element, the second driver element and the control unit are located in the cabinet, and a movable door is pivoted on the front side of the cabinet.

\* \* \* \* \*